(12) United States Patent
Adachi

(10) Patent No.: US 6,829,474 B1
(45) Date of Patent: Dec. 7, 2004

(54) SYSTEM FOR PROVIDING MULTIMEDIA VALUE-ADDED SERVICES

(75) Inventor: Tetsuji Adachi, Tokyo (JP)

(73) Assignee: NEC Corporation, Tokyo (JP)

( * ) Notice: Subject to any disclaimer, the term of this patent is extended or adjusted under 35 U.S.C. 154(b) by 611 days.

(21) Appl. No.: 09/651,069

(22) Filed: Aug. 30, 2000

(30) Foreign Application Priority Data

Aug. 30, 1999 (JP) ........................................ 1999-242765
May 23, 2000 (JP) ........................................ 2000-151192

(51) Int. Cl.$^7$ ............................................ H04M 11/10
(52) U.S. Cl. ................ 455/414.1; 455/414.2; 455/414.3; 455/411; 379/201.01; 379/201.03; 379/201.05
(58) Field of Search ..................... 455/414.1, 414.2, 455/414.3, 414.4, 413, 418, 550.1, 566; 379/67.1, 88.18, 93.07, 93.08, 201.03, 201.04, 201.05; 340/825.37

(56) References Cited

U.S. PATENT DOCUMENTS

| | | | | |
|---|---|---|---|---|
| 5,675,738 A | * | 10/1997 | Suzuki et al. | ................ 709/219 |
| 6,047,376 A | * | 4/2000 | Hosoe | ........................ 713/201 |
| 6,161,133 A | | 12/2000 | Kikinis | |
| 6,175,873 B1 | * | 1/2001 | Yamane et al. | ............. 709/237 |

FOREIGN PATENT DOCUMENTS

| | | |
|---|---|---|
| GB | 2 295 256 | 5/1996 |
| JP | 3-295337 | 12/1991 |
| JP | 8-138033 | 5/1996 |
| JP | 9182046 | 7/1997 |
| JP | 1074178 | 3/1998 |
| JP | 10-215318 | 8/1998 |
| JP | 10-240656 | 9/1998 |
| JP | 10-312343 | 11/1998 |
| JP | 10-327250 | 12/1998 |
| JP | 11-134264 | 5/1999 |
| WO | 00/65812 | 11/2000 |
| WO | 00/79756 | 12/2000 |

* cited by examiner

Primary Examiner—William Trost
Assistant Examiner—Danh Le
(74) Attorney, Agent, or Firm—Young & Thompson (57) ABSTRACT

A multimedia value-added services providing system allowing a user to easily obtain desired value-added services is disclosed. A control server controls a plurality of value-added service servers. A gateway server connected to the control server and a terminal includes a translator for performing a translation between information according to a protocol used in each of the value-added service servers and information according to a generalized description language operable in a user's terminal. The gateway server provides a unified interface to the terminal such that the terminal is allowed to gain access to any of the value-added service servers under a single interface condition.

19 Claims, 11 Drawing Sheets

SYSTEM FOR PROVIDING MULTIMEDIA VALUE-ADDED SERVICES

BACKGROUND OF THE INVENTION

1. Field of the Invention

The present invention relates to a multimedia value-added services providing system in a telecommunication network.

2. Description of the Prior Art

The remarkable progress of telecommunications has been made in recent years, and it is no exaggeration to say that we are all being exposed to a communications revolution. Hereafter, a brief overview of the progress of telecommunications will be provided.

In the field of fixed telephone networks, ISDN (Integrated Services Digital Network) is progressing and its data transmission rate has reached levels of Gbps (gigabits per second), allowing video data or moving-picture data to be sufficiently transferred. Further, an intelligent network having intelligent nodes installed therein has been realized to allow users to be provided with value-added services by selectively accessing to the intelligent nodes each storing scenarios for realizing various kinds of value-added services.

In the field of mobile networks, advances in miniaturization and lower-prices of mobile telephone terminals have caused the number of subscribers to be dramatically increased. Further, not only real-time voice communication services but also other service contents including voice mail services for storing voice messages, short message services for sending and receiving short text messages, and the likes, have been provided in recent mobile networks. Furthermore, with advances in Wideband-CDMA (Code Division Multiple Access) techniques, the next-generation mobile communications called IMT2000 is just around the corner. Accordingly, an increasing amount of data is expected to be transferred through mobile networks.

On the other hand, the Internet undergoes an astonishing explosion, which is caused by the explosion in the use of personal computers in home. There is progressing a global environment where various kinds of information around the world can be efficiently used and transmitted by an individual.

Such a telecommunication network is expected to undergo further development to the increased variety of media such as voice, text, still and video images, the increased variety of transfer means such as fixed telephone network, mobile network, and Internet, and the increased variety of services such as media conversion, the promotion of intelligent technologies, and the promotion of personalization.

In multimedia value-added services provided in telecommunication networks, however, each service requires a different user interface. Therefore, a plurality of user interfaces exits in the networks, resulting in real inconvenience for every user.

To ease such inconvenience, an information providing system has been disclosed in Japanese Patent Application Unexamined Publication No. 10-74178, which is designed to provide every user with a unified user interface for a plurality of information servers by hiding a server-dependent command with an information object.

Further, a communication supporting system has been disclosed in Japanese Patent Application Unexamined Publication No. 9-182046, which is designed to improve the efficiency of communications by a standard application programming interface connecting a user interface control program to a plurality of communication media control programs to allow closer connections between communication media.

From a common carrier's point of view, in the case of a new value-added service introduced into the existing network, not only the provision of a new value-added service server but also the addition of some provision or the matching of interface conditions to existing devices related to the new value-added service server are needed all over the existing network. Such costly provisioning is burdened on the common carrier and finally, the charge for such a new service will be born by users.

SUMMARY OF THE INVENTION

An object of the present invention is to provide a multimedia value-added services providing system allowing a user to easily obtain desired value-added services.

Another object of the present invention is to provide a multimedia value-added services providing system allowing easy provisioning of a new value-added service into an existing network.

According to an aspect of the present invention, a system for providing value-added services to a subscriber through a telecommunication network, includes: a plurality of value-added service servers, each of which provides the subscriber with a corresponding value-added service; a control server connected to the plurality of value-added service servers through respective interfaces, for controlling the plurality of value-added service servers; a terminal of the subscriber, which is connected to the telecommunication network and has a browser installed therein, wherein the browser is operable according to a generalized description language; and a gateway server which is connected to the control server and is connected to the terminal through the telecommunication network, wherein the gateway server includes a translator for performing a translation between information according to a protocol used in each of the value-added service servers and information according to the generalized description language.

The gateway server may provide a unified interface to the terminal such that the terminal is allowed to gain access to any of the value-added service servers under a single interface condition.

The control server may control the plurality of value-added service servers and a switching system included in the telecommunication network based on a requested service received from the terminal. The control server may perform an incoming call transfer control from the terminal to a requested destination by controlling the switching system that received an incoming call to the terminal. The control server may instruct an intelligent network to perform an incoming call transfer control from the terminal to a requested destination by controlling the switching system that received an incoming call to the terminal.

The control server preferably stores a predetermined service scenario, wherein the control server controls the value-added service servers and a switching system included in the telecommunication network based on the service scenario stored. The system may further include a personal database for retrievably storing a plurality of service scenarios defined by individual subscribers. The control server controls the value-added service servers and a switching system included in the telecommunication network based on a service scenario retrieved from the personal database according to an instruction received from a subscriber.

A new service scenario may be stored in the personal database by an authenticated subscriber. Each of the service scenarios stored in the personal database may be updated by a corresponding authenticated subscriber.

The system may further include a scenario server for retrievably storing a plurality of service scenarios created by an authenticated third party, wherein the control server controls the value-added service servers and a switching system included in the telecommunication network based on a service scenario retrieved from the personal database according to an instruction received from a subscriber.

Each of the service scenarios stored in the scenario server may be updated by the authenticated third party. A billing database for billing the subscriber by using the service scenario under control of the control server may be included.

According to another aspect of the present invention, a system for providing value-added services to a subscriber through a telecommunication network, includes: a plurality of value-added service servers, each of which provides the subscriber with a corresponding value-added service; a control server connected to the plurality of value-added service servers through respective interfaces, for controlling the plurality of value-added service servers; a terminal of the subscriber, which is connected to the telecommunication network and has a browser installed therein, wherein the browser is operable on a display according to a generalized description language; and a gateway server which is connected to the control server and is connected to the terminal through the telecommunication network, wherein the gateway server includes a translator for performing a translation between information according to a protocol used in each of the value-added service servers and information according to the generalized description language. The terminal performs an access control to any of the value-added service servers by operating a menu displayed on the display.

As described above, according to the present invention, a desired combination of various multimedia value-added services can be provided to individual users with a unified interface depending on a usage pattern of each user.

Since the personal database can also store service scenarios for individual users, by previously setting a desired scenario, a desired combination of value-added services can be obtained by each user, resulting in improved convenience and improved flexibility in service addition or update.

Further, it is possible to outsource creation of a personal scenario to a third party ensuring a predetermined level of security, resulting in further improved convenience to subscribers.

Furthermore, since a unified interface is provided, even in the case of a new value-added service introduced into the existing network, neither the addition of some provision nor the matching of interface conditions to existing devices related to the new value-added service server is needed all over the existing network. Therefore, the burden on a common carrier becomes lighter.

DESCRIPTION OF THE PREFERRED EMBODIMENTS

FIRST EMBODIMENT

Figure 1:
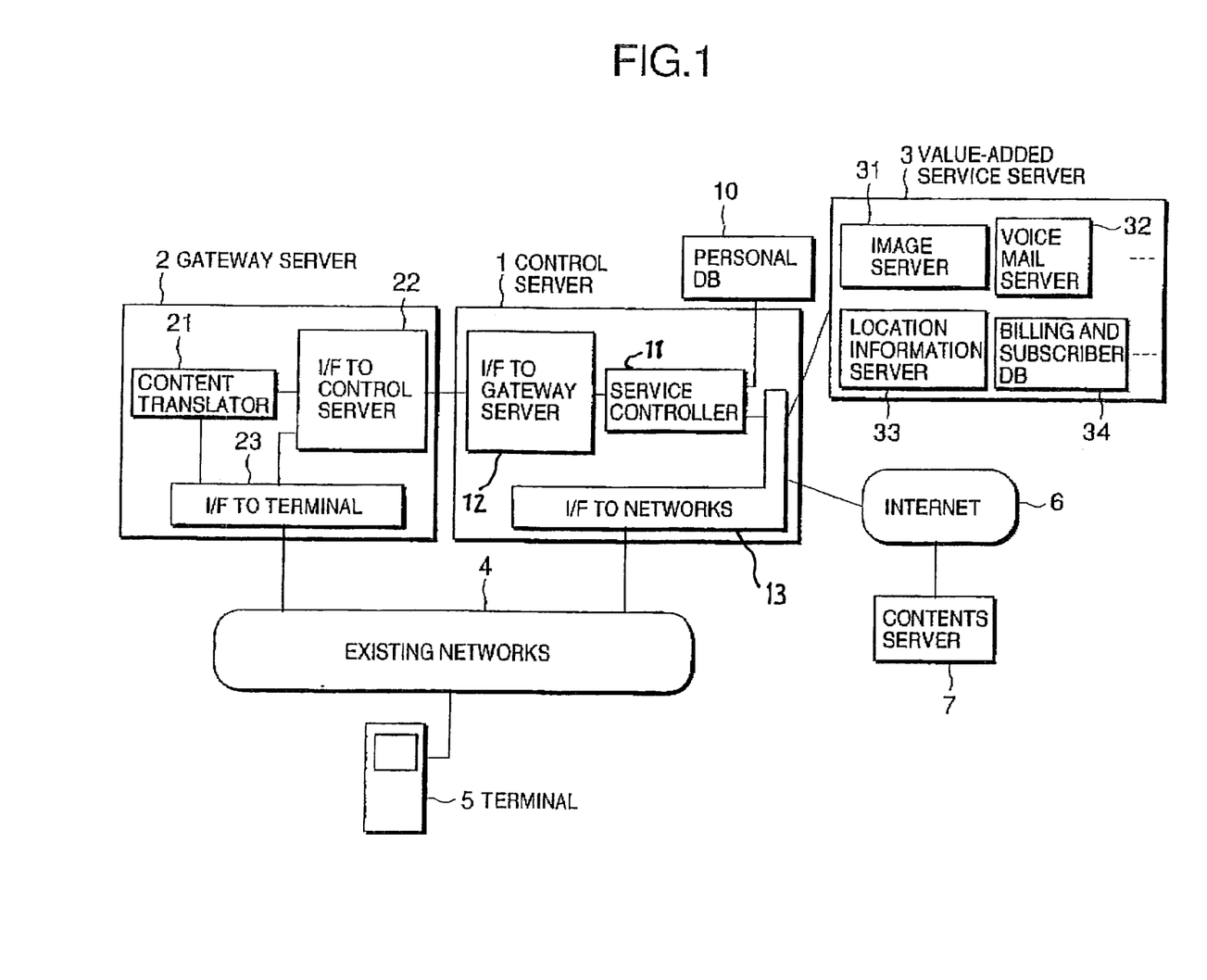
FIG. 1 is a block diagram showing a system configuration of a multimedia value-added services providing system according to a first embodiment of the present invention.

Referring to FIG. 1, a multimedia value-added services providing system according to a first embodiment of the present invention has two main servers: a control server 1 and a gateway server 2, allowing a value-added service server 3 to provide any combination of value-added services, or integrated value-added services, to a terminal 5.

The value-added service server 3 is an aggregate of servers, each of which has a function of providing a corresponding value-added service to individual users. Here, the value-added service server 3 includes an image server 31 for providing information relating to images to each user, a voice mail server 32 for providing voice mail service, location information server 33 for providing service associated with location information to a user carrying a mobile terminal, a billing and subscriber database 34 for providing management information to the network manager, and further a home location register (not shown) associated with mobile network maintenance and management, SCP(service control point)/SMS(service management system) (not shown) in an intelligent network (IN), and other servers. These servers are connected to the control server 1 through respective interfaces. The value-added service server 3 can add a new service server thereto, allowing an enlarged variety of services. Further, various contents server 7 in the Internet 6 may be used.

The control server 1 is a server for providing integrated services to individual users so that each user can use services without concern for differences in interface and server. The control server 1 includes a service controller 11, a gateway server interface 12, and a network interface 13. The service controller 11 is connected to a personal database 10. The gateway server interface 12 controls communication with the gateway server 2, and the network interface 13 controls communications with the value-added service server 3, an existing network 4 such as mobile network or fixed telephone network, and the Internet 6.

The service controller 11 has functional elements each associated with service call control and unit services for implementing each the functional elements. In addition, the service controller 11 stores a scenario defining combinations of unit services and functional elements for each type of service call. Therefore, the service controller 11 combines value-added services provided by the value-added service server 3 depending on a service call to provide integrated services to the user. As described later, a scenario for each user can be created and stored in the personal database 10.

The gateway server 2 can be connected to a terminal 5 via the existing network 4 and has a function of providing a unified interface to the terminal 5. The gateway server 2 includes a content translator 21, a control server interface 22, and a terminal interface 23. The control server interface 22 controls communication with the control server 1, and the terminal interface 23 controls communications with the terminal 5.

The content translator 21 performs a translation between control and response information based on individual protocols of value-added services combined in the control server 1 and a generalized description language operable in the terminal 5. More specifically, the terminal 5 is provided with a display and has a browser function that allows a menu screen to be displayed on the display. Therefore, it is necessary to use a generalized description language operable in the browser of the terminal 5 between the gateway server 2 and the terminal 5. As a generalized description language, HTML (hypertext markup language), XML (extensible markup language), and WML (wireless markup language) may be used.

The gateway server 2 further has functions of authenticating an access received from each terminal connected to the gateway server 2 through the existing network 4 and transferring the request of each user to the control server 1 in a prescribed interface condition.

As described before, the service controller 11 combines value-added services provided by the value-added service server 3 depending on a scenario to provide a combination of value-added services to the user. And a scenario for each user can be stored in the personal database 10. Therefore, creation of a scenario is open to outside service vendors under a predetermined level of security and thereby increased scenarios can be stored in a dedicated value-added service server. This would cause a service provided through the value-added server 3 to be further improved. For example, even if a certain user feels it difficult to create a scenario, such a user can use, with or without charge, a desired scenario that has been created by a service vendor and stored in the dedicated value-added service server. In this way, an increasing number of users can obtain the value-added services.

EXAMPLES OF VALUE-ADDED SERVICE

Incoming Call Selective Transfer Service

Figure 2:
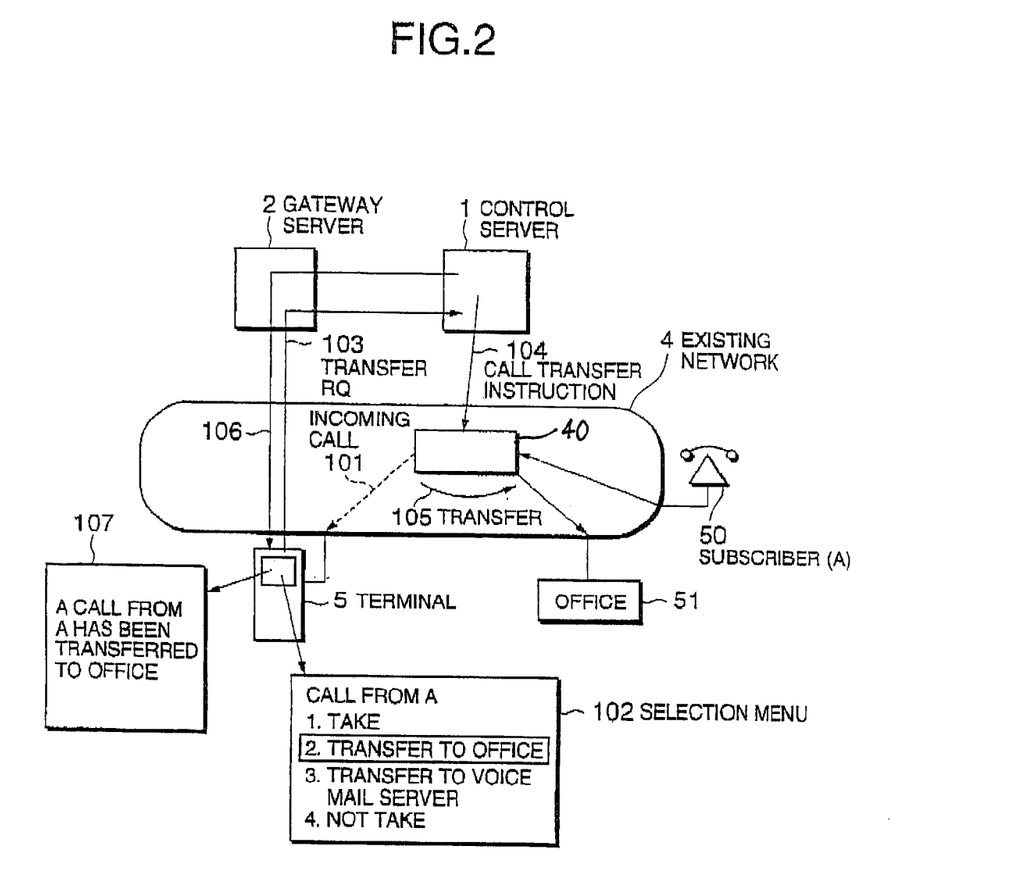
FIG. 2 is a block diagram showing an incoming call selective transfer service in the first embodiment of the invention.

In the incoming call selective transfer service, when a subscriber originates a call to the terminal 5, the user of the terminal 5 can select the processing of the incoming call.

Referring to FIG. 2, when receiving an incoming call from a switching system 40 (step 101), a program-controlled processor (not shown) of the terminal 5 starts a selection menu program to display a selection menu on the display of the terminal 5 (step 102). In the case where a signaling transfer channel other than a communication channel has been provided between the switching system 40 and the terminal 5, the switching system 40 transfers notification of the incoming call directly to the terminal 5 through the signaling transfer channel without establishing the communication channel.

In this example, the user of the terminal 5 operates a predetermined key of the terminal 5 while looking at the selection menu on screen to make a choice among several alternatives: "take"; "transfer to office"; "transfer to voice mail"; and "not take". The phone number of transfer destination has been stored by the user operating the keypad.

For example, when selecting "transfer to office" as shown in FIG. 2, a transfer request that the call is transferred to the office is transmitted to the control server 1 through the gateway server 2 according to a predetermined path setup control (step 103). The transfer request includes processing identification information identifying the requested processing, user identification information, and the phone number of the office as transfer destination.

When receiving the transfer request, the control server 1 instructs the switching system 40 to perform the transfer processing of the call from the terminal 5 to the office 51 (step 104).

In response to the call transfer instruction from the control server 1, the switching system 40 performs the call transfer operation of the incoming call from the terminal 5 to the office 51 (step 105).

When receiving transfer completion notification from the switching system 40, the control server 1 establishes a path to the terminal 5 through the gateway server 2 and sends the terminal 5 a status indicating that the requested call transfer has been completed (step 106). As described before, in the gateway server 2, the content translator 21 translates the contents of the status into the generalized description language operable in the terminal 5 and the translated contents of the status are transmitted to the terminal 5 through the existing network 4. As the result, a message indicating that the call from the subscriber (A) 50 has been transferred to the office is displayed on the display of the terminal 5 (step 107).

Voice Mail Service

Figure 3:
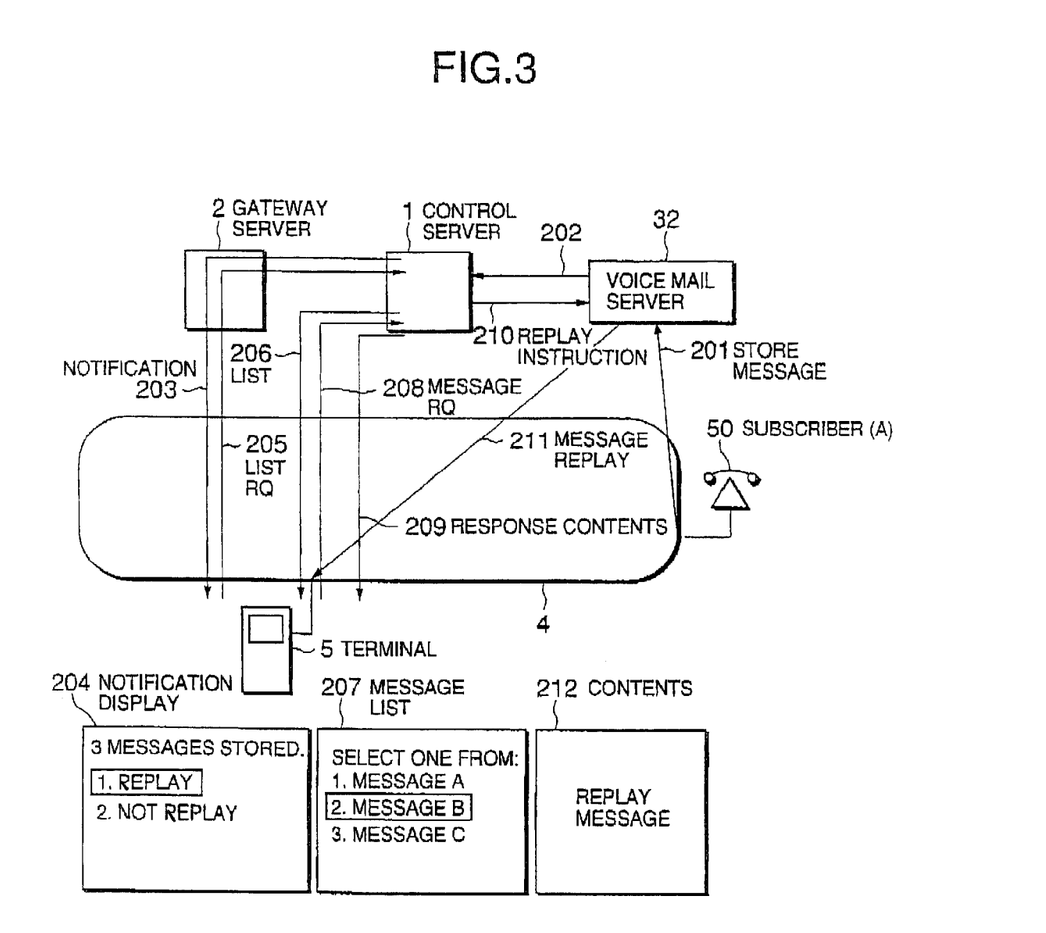
FIG. 3 is a block diagram showing voice-mail notification and message request services in the first embodiment of the invention.

An operation of voice mail service will be described, taking as an example the case where a voice mall from the subscriber 50 to the terminal 5 is stored in the voice mail server 32.

Referring to FIG. 3, when a voice mail to the terminal 5 has been stored in the voice mail server 32 (step 201), the voice mail server 32 transmits notification that a new voice mall to the terminal 5 has been stored to the control server 1 (step 202).

When receiving the notification from the voice mall server 32, the control server 1, as in the case of FIG. 2, establishes a path to the terminal 5 through the gateway server 2 and transmits the notification to the terminal 5 to notify the terminal 5 that the voice mail to the terminal 5 has been stored (step 203). If the notification is described in language that is not operable in the terminal 5, then the content translator 21 of the gateway server 2 translates the contents of the status into the generalized description language operable in the terminal 5 and the translated contents of the notification are transmitted to the terminal 5 through the existing network 4.

As the result, the contents of the notification and a replay selection menu are displayed on the display of the terminal 5 (step 204). In this example, the notification that three messages are stored in the voice mail sever 32 is displayed on screen. Hereafter, the descriptions regarding the gateway server 2 such as content translation and communication with the terminal 5 will be omitted for simplicity.

When the user selects "replay" as shown in FIG. 3, the terminal 5 transmits a list request to the control server 1 (step 205). In response to the list request, the control server 1 reads a message list from the voice mail server 32 and transmits it to the terminal 5 (step 206). The message list received from the control server 1 is displayed on the display of the terminal 5 (step 207).

If the user makes a choice among the alternatives (here, message B is selected), then a message request that the message B is selected from the three stored messages is transmitted from the terminal 5 to the control server 1 (step 208).

When receiving the message request from the terminal 5, the control server 1 transmits a response to the message request back to the terminal 5 (step 209) and thereby the response contents are displayed on the display of the terminal 5, further, the control server 1 instructs the voice mail server 32 to replay the message selected by the user (step 210).

The voice mall server 32, when receiving the replay instruction, originates a call to the terminal 5 in the existing network 4 to establish a connection to the terminal 5 and thereafter transmits the voice message to the terminal 5 (step 211). At the terminal 5, a message "Replay message" is displayed on screen and then voice message is replayed (step S212).

Customer Control Service

Figure 4:
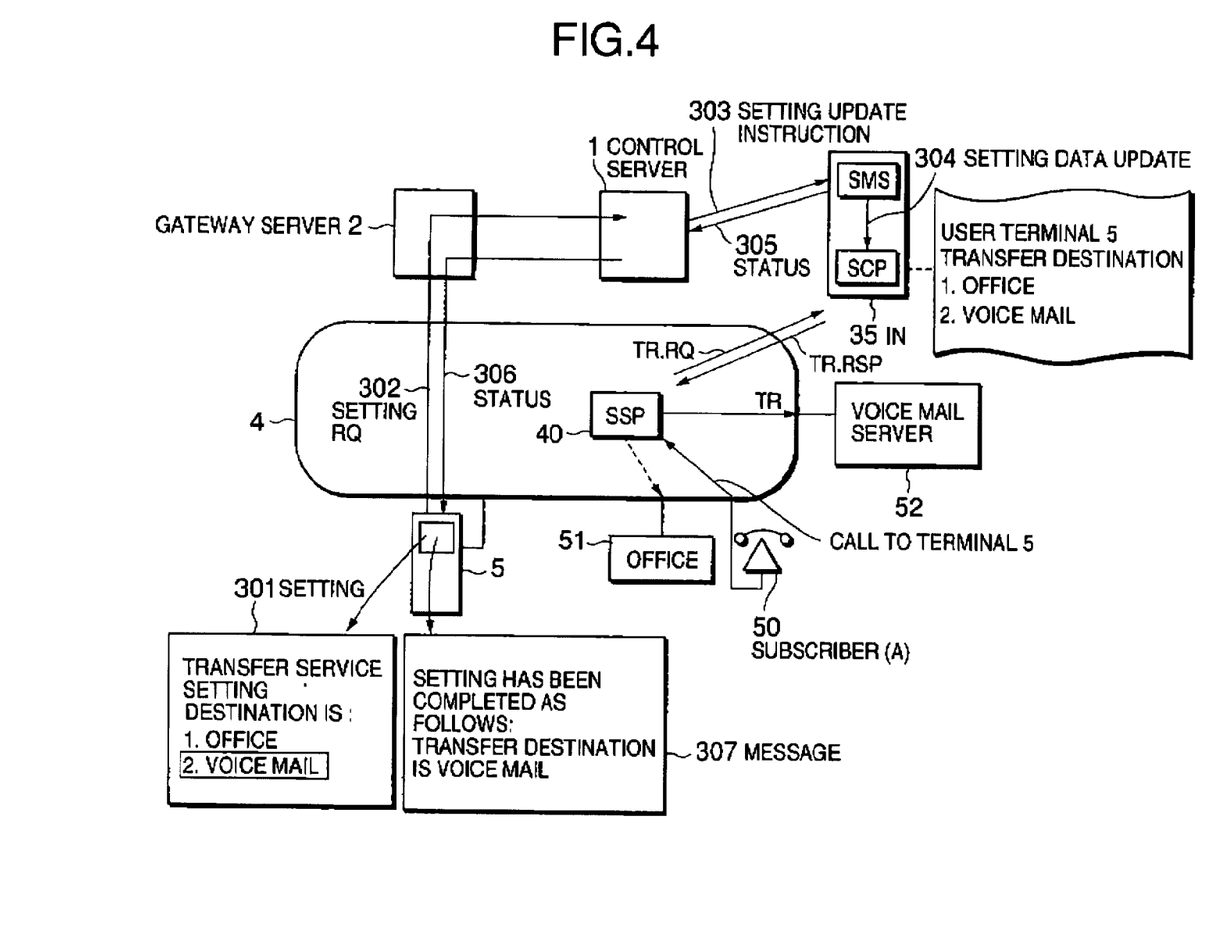
FIG. 4 is a block diagram showing an example of customer control service in the first embodiment of the invention.

As shown in FIG. 4, it is assumed that the terminal 5 is obtaining the incoming call transfer service via an intelligent network (IN) 35 and is allowed to make a choice as transfer destination between the office 51 and the voice mall server 52.

Referring to FIG. 4, when a service switching point (SSP) 40, which is a switching system, detects a call originated by the subscriber 50 and destined to the terminal 5, the SSP 40 detects that the terminal 5 is obtaining the incoming call transfer service and gets access to the IN 35. The IN 35 searches the SCP (service control point) for the phone number of the transfer destination and sends it back to the SSP 40. The SSP 40 transfers the incoming call to the terminal 5 to the transfer destination identified by the found phone number. If the transfer destination is set to the office 51, then the incoming call to the terminal 5 is transferred to the office 51. If the transfer destination is set to the voice mail server 52, then the incoming call to the terminal 5 is transferred to the voice mall server 52.

Such a service that a service condition stored in a value-added service server such as the SCP can be changed by the terminal 5 is referred to as "customer control service".

When a user desires the customer control service, a setting menu is displayed on the display and the user makes a choice among the alternatives (here, transfer destinations) (step 301). When one of the transfer destinations is selected, the terminal 5 transmits a setting request to the control server 1 (step 302).

When receiving the setting request, the control server 1 performs a control operation depending on the setting request. For example, in the case where the setting request indicates that the transfer destination is changed, the control server 1 instructs the SMS (service management system) of the IN 35 to update the setting data of the SCP (step 303). In this example, the transfer destination set in the SCP is changed to either the office 51 or the voice mail server 52 (step 304).

When receiving a status indicating that the setting data update has been completed (step 305), the control server 1 transmits a status indicating that the setting data update has been completed to the terminal 5 (step 306). Therefore, a message indicating that the setting has been completed is displayed on the display of the terminal 5 (step 307).

Application of Customer Control Service

Figure 5:
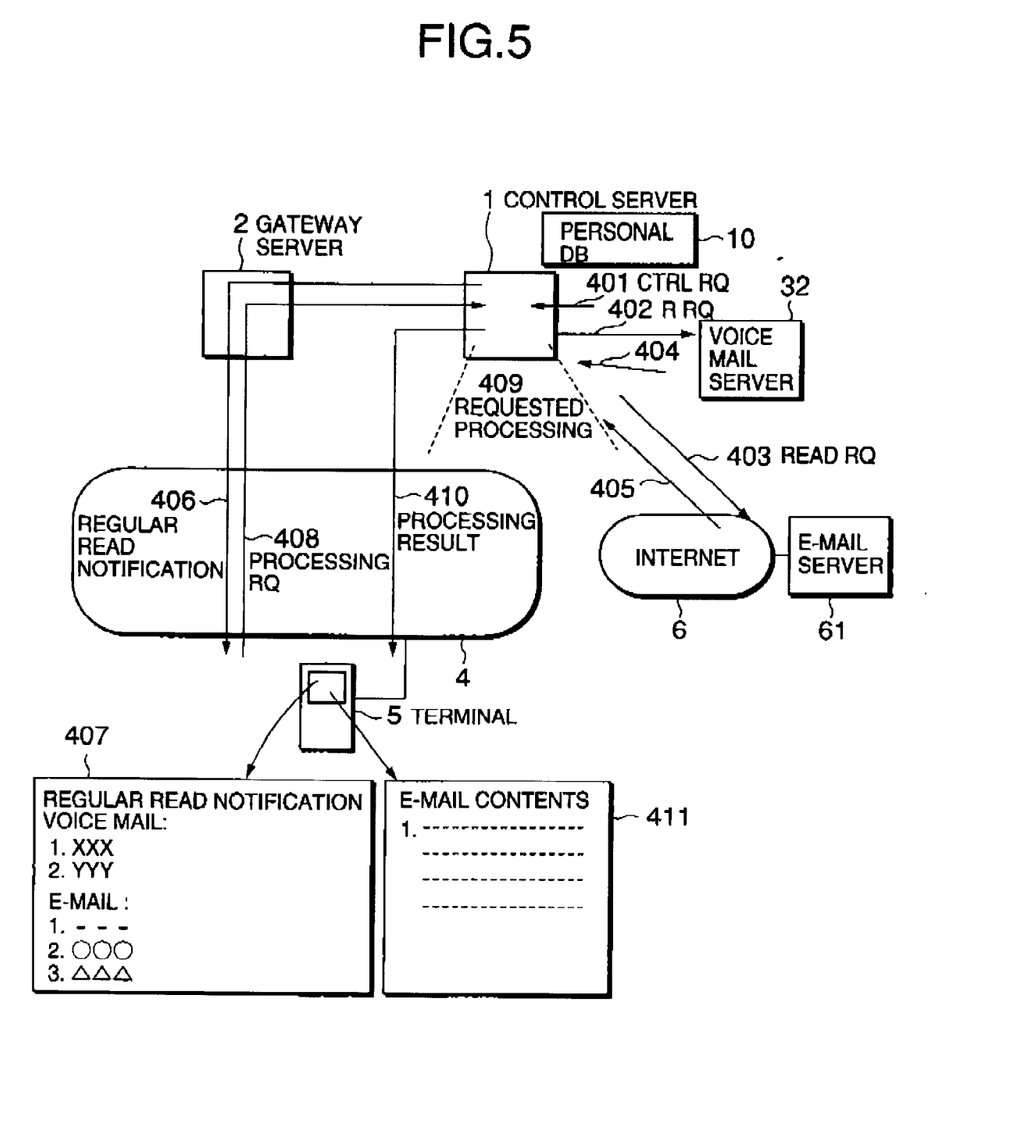
FIG. 5 is a block diagram showing an application of customer control service in the first embodiment of the invention.

An application of customer control service is designed to provide a user with services dedicated to the user by changing the setting data of the personal database 10.

The personal database 10 stores a processing scenario that is defined by the user and is used depending on a preset condition such as a preset time or an event originating from the value-added services server. Here, it is assumed that the personal database 10 stores a personal scenario for the subscriber of the terminal 5 in which the voice mail server 32 and the e-mail server 61 notify the terminal 5 at programmed times of day whether a message addressed to the terminal 5 is stored.

Referring to FIG. 5, the personal database 10 sends a request for scenario control corresponding to a registered subscriber (here, terminal 5) to the control server 1 at a programmed time of day (step 401). Since the scenario set in the personal database 10 is to read a voice mail and e-mail, the control server 1 sends a read request for stored information regarding the terminal 5 to the voice mail server 32 (step 402) and sends a read request for stored information regarding the terminal 5 to the e-mail server 61 through the Internet 6 (step 403).

When receiving responses to the read requests from the voice mail server 32 and the e-mail server 61, respectively (steps 404 and 405), the control server 1 transmits a regular read notification to the terminal 5 (step 406). Based on the regular read notification, a menu indicating the readout information is displayed on the display of the terminal 5 (step 407). The contents of this menu and its display layout can be arbitrarily set depending on the setting data of the personal database 10. the subscriber of the terminal 5 makes a choice among the displayed items and thereby a processing request is sent to the control server 1 (step 408).

The control server 1 performs the processing depending on the processing request received from the terminal 5 (step 409) and sends its processing result back to the terminal 5 (step 410).

In the case where the requested processing is voice-mail notification, the control server 1 instructs the voice mail server 32 to transmit a voice mail notification directly to the terminal 5 as shown in FIG. 3.

In the case where the requested processing is e-mail notification, the control server 1 processes the e-mail received from the e-mail server 61 according to a user's requested form (e.g. only sender/all text/only selected e-mail) and then transmits it to the terminal 5. The e-mail information received from the control server 1 is displayed on the display of the terminal 5 (step 411).

Scenario Registration

Figure 6:
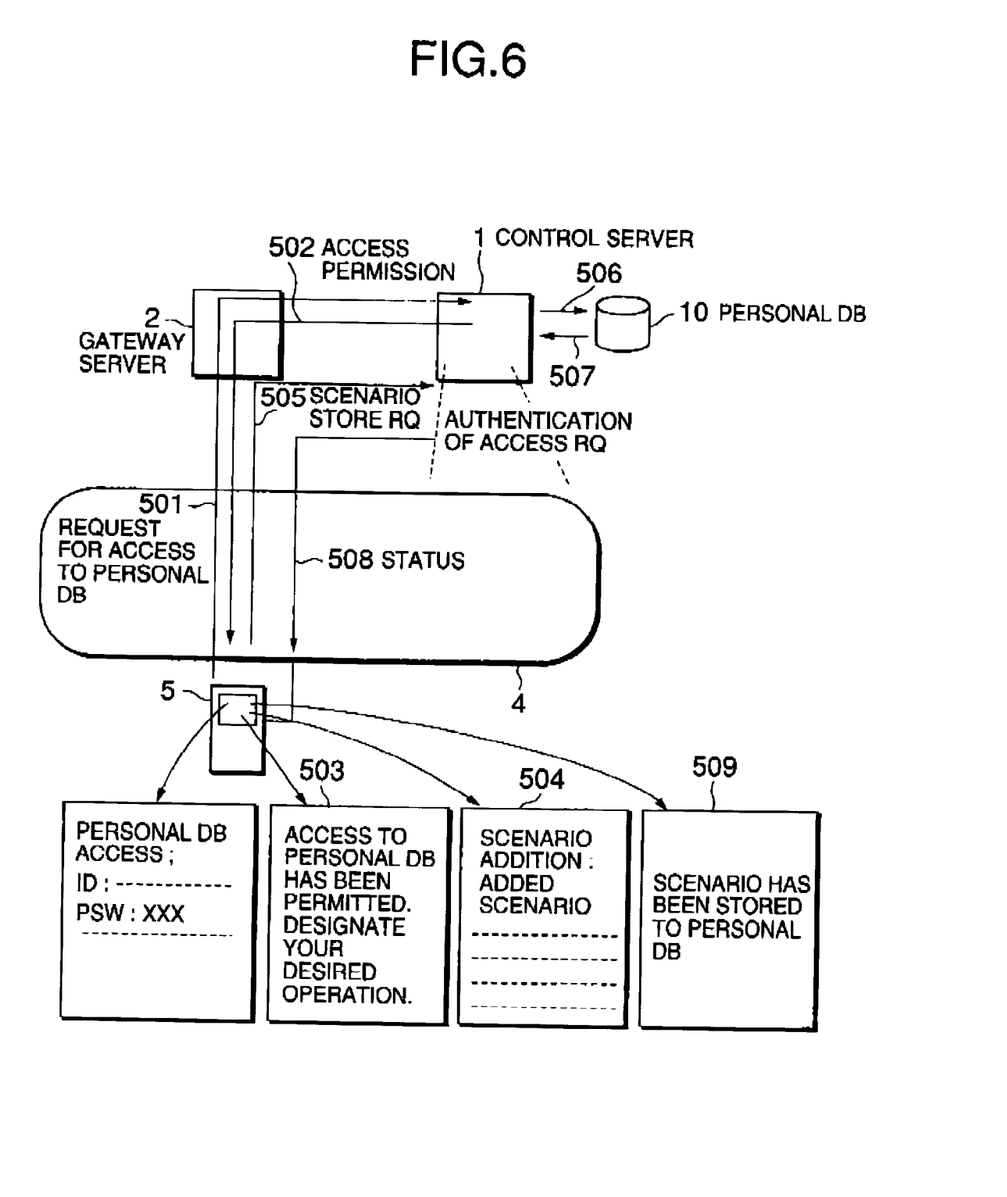
FIG. 6 is a block diagram explaining an operation of storing personal scenario to a personal database in the first embodiment of the invention.

First, a scenario addition/update request is transmitted from the terminal 5 to the control server 1 (step 501) as shown in FIG. 6. The control server 1 determines whether the subscriber of the terminal 5 is authenticated and, if necessary, prompts the subscriber to enter a password. When the access to the personal database 10 is permitted, the control server 1 sends a desired operation input instruction to the terminal 5 (step 502).

When receiving the desired operation input instruction from the control server 1, a message indicating that the access is permitted is displayed on the display of the terminal 5 (step 503). The user of the terminal 5 inputs a desired scenario description through its keypad according to a predetermined scenario creation rule (step 504) and, when the desired scenario has been completed, transmits a scenario store request to the control server 1 (step 505).

When receiving the scenario store request from the terminal 5, the control server 1 instructs the personal database 10 to store the personal scenario of the subscriber (step 506). When the personal scenario has been completely stored, the personal database 10 notifies the control server 1 of scenario store completion (step 507). Then, the control server 1 transmits a status indicating that the scenario has been stored in the personal database 10 to the terminal 5 (step 508). This causes the contents of the received status to be displayed on the display of the terminal 5 (step 509).

Use of Outside Vendor

Figure 7:
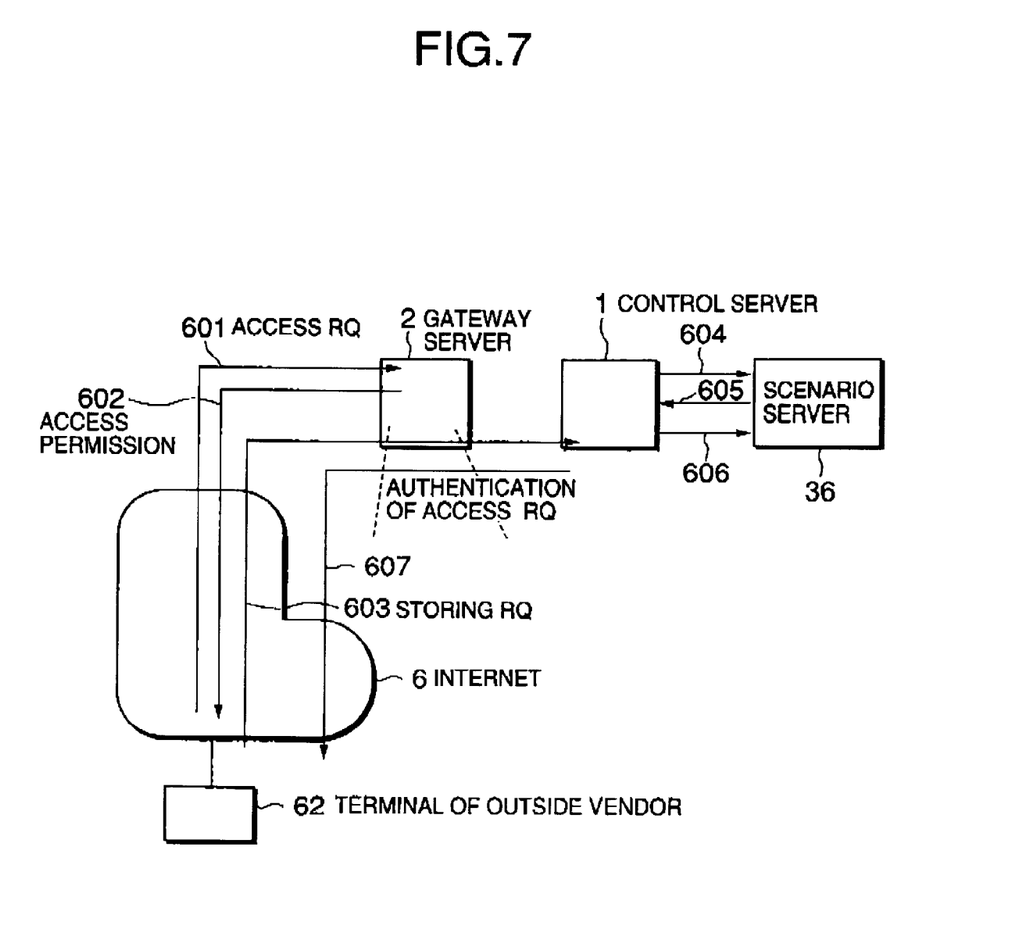
FIG. 7 is a block diagram explaining operations of storing personal scenario in a scenario server so as to allow the user to use it in the case where the personal scenario has been created by a third-party vendor.

Personal scenarios may be created by previously registered outside vendors given permission to create scenarios. As described before, the gateway server 2 further has a security check function of authenticating an access received from an outside vendor through the existing network 4 so as to prevent unauthorized accesses of outside vendors other than the outside vendors given permission to create scenarios.

(Scenario Registration)

Referring to FIG. 7, when an outside vendor has created a personal scenario, a terminal 62 connected to the Internet 6 is used to send an access request to the gateway server 2 (step 601). When this access request is authenticated by the gateway server 2, access permission is given to the terminal 62 (step 602). Then, the terminal 62 sends a storing request and scenario data to the control server 1 (step 603). The control server 1 gets access to the scenario server 36 so as to ensure a storage area for the outside vendor in the scenario server 36 (step 604). When such a storage area has been ensured (step 605), the control server 1 makes a request that the scenario data received from the outside vendor is stored in the scenario server 36 (step 606). When the scenario data has been completely stored, the control server 1 sends a registration completion notification to the terminal 62 (step 607).

(Use of Registered Scenario)

Figure 8:
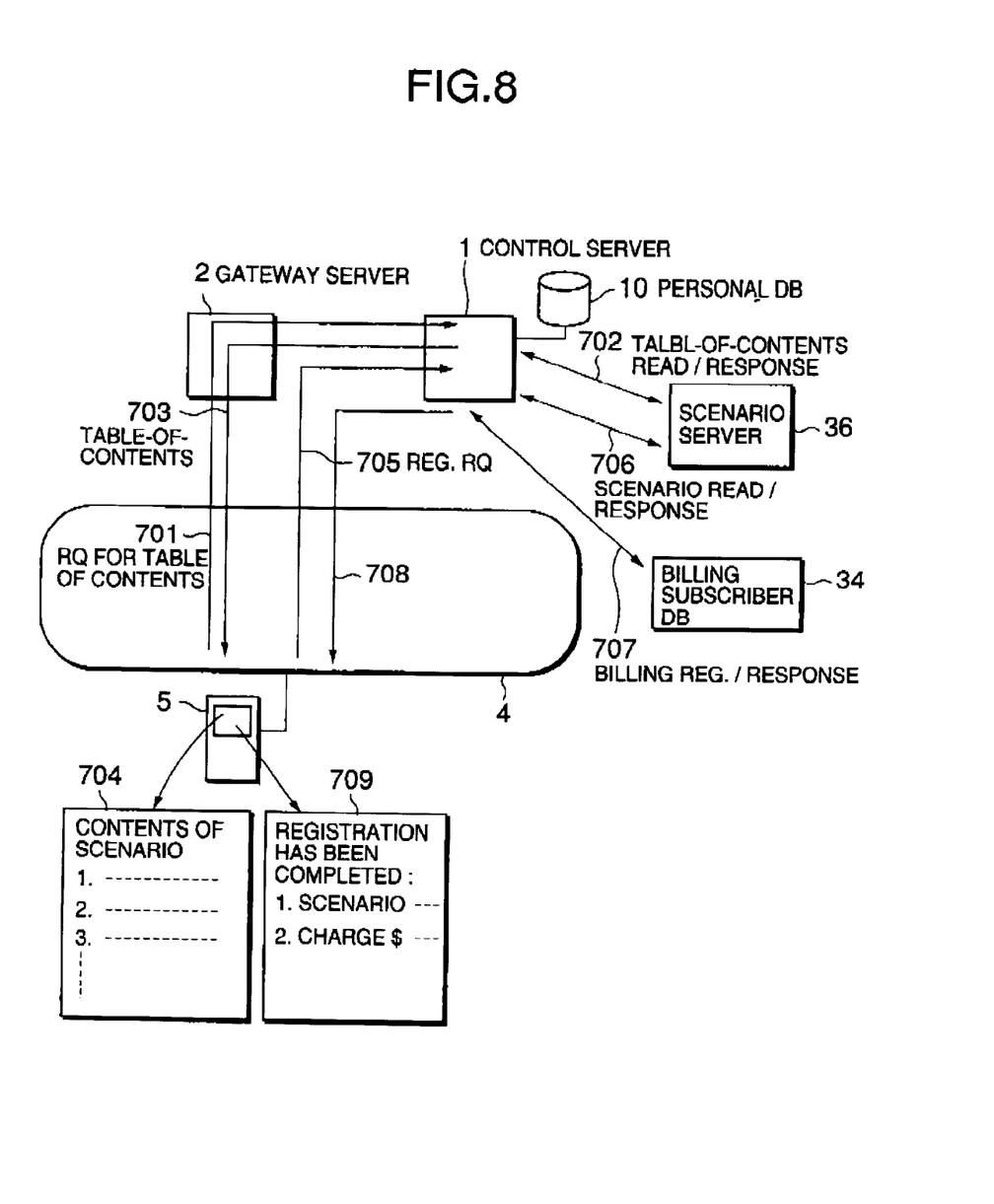
FIG. 8 is a block diagram explaining an example where the user uses the personal scenario stored in the scenario server by transferring it to the personal database.

Referring to FIG. 8, the subscriber uses a predetermined function of the terminal 5 to send a request for table of contents of scenario to the control server 1 (step 701). In response to the request for table of contents, the control server 1 reads the table of contents from the scenario server 36 (step 702) and sends the table-of-contents data back to the terminal 5 (step 703).

The table of contents of scenario is displayed on the display of the terminal 5 (step 704). In this example, the outline of function, charge/no-charge, and price are displayed for each scenario. The user selects a desired one of the scenarios to send a request for registration into the personal database 10 to the control server 1 (step 705).

When receiving the registration request from the terminal 5, the control server 1 transfers the selected scenario from the scenario server 36 to the user's area of the personal database 10 (step 706). In the case where the selected scenario is offered at cost, the control server 1 gets access to the billing and subscriber database 34 and registers charge information regarding the purchase of the selected scenario into the billing and subscriber database 34 (step 707).

When the above steps have been completed, the control server 1 notifies the terminal 5 of the purchase procedure completion (step 708). At the terminal 5, the purchase procedure completion information is displayed on the display (step 709).

SECOND EMBODIMENT

Figure 9:
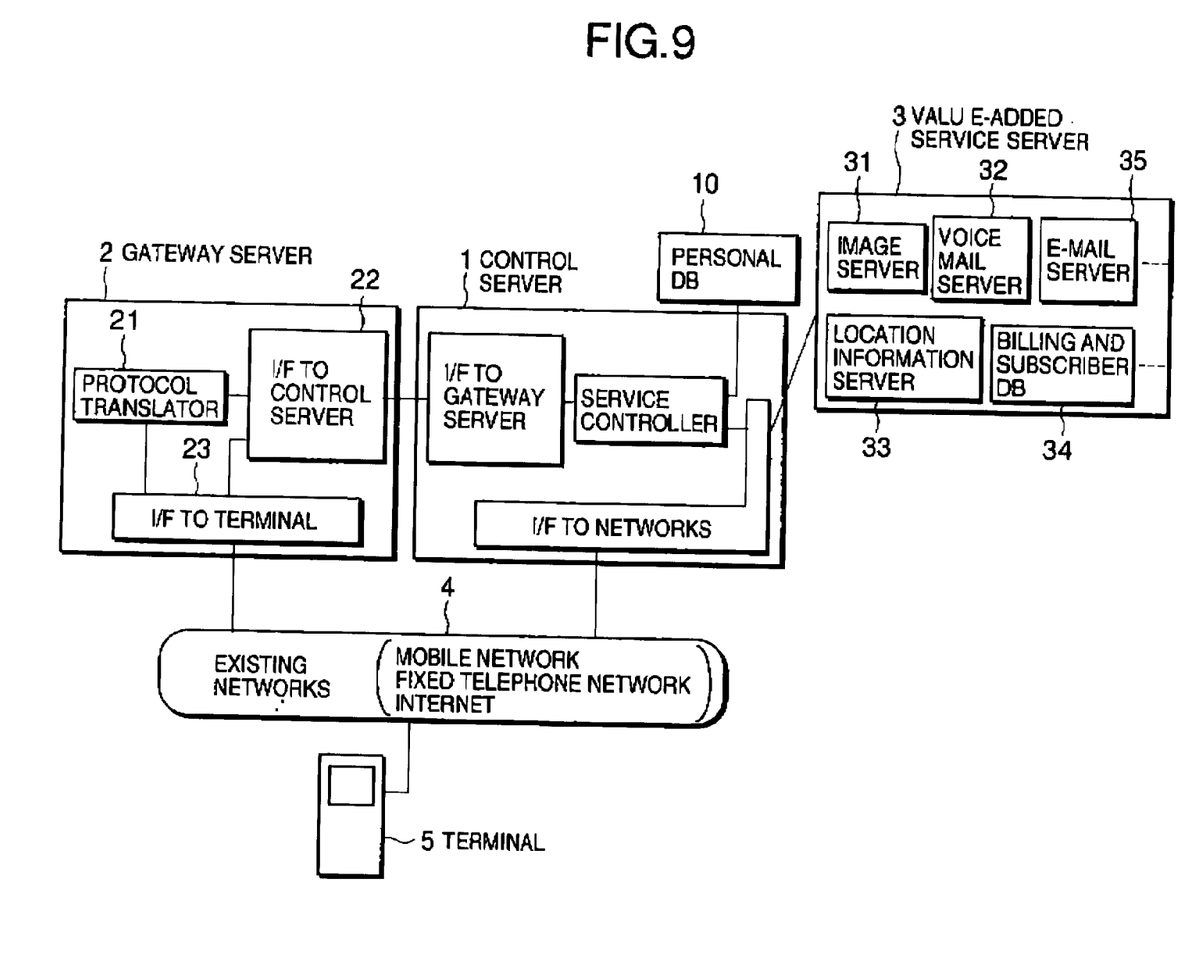
FIG. 9 is a block diagram showing a system configuration of a multimedia value-added services providing system according to a second embodiment of the present invention.

FIG. 9 shows a system configuration according to a second embodiment of the present invention, in which blocks similar to those previously described with reference to FIG. 1 are denoted by the same reference numerals and the details are omitted.

In FIG. 9, the value-added service server 3 includes an intelligent network having e-mail server 35 in addition to the image server 31, the voice mail server 32, the location information server 33, and the billing and subscriber database 34.

Further, the gateway server 2 includes a protocol translator 21, which has basically the same function as in the content translator of FIG. 1. In the second embodiment, WML (wireless markup language) is installed to handle mobile terminals in the mobile network. WML is a generalized description language suitable for the vase where the available bandwidth of a channel is relatively narrow and the terminal 5 has a relatively low processing capability as in the case of a mobile telephone. In this case, the gateway server 2 recognizes the code information of the contents received from the value-added service server 3 through the control server 1. Thereafter, to reduce the processing load applied to the terminal 5, the gateway server 2 encodes and compiles a part of information to be processed at the terminal 5 to produce binary data and transmits it to the terminal 5 through the existing network 4.

Figure 10:
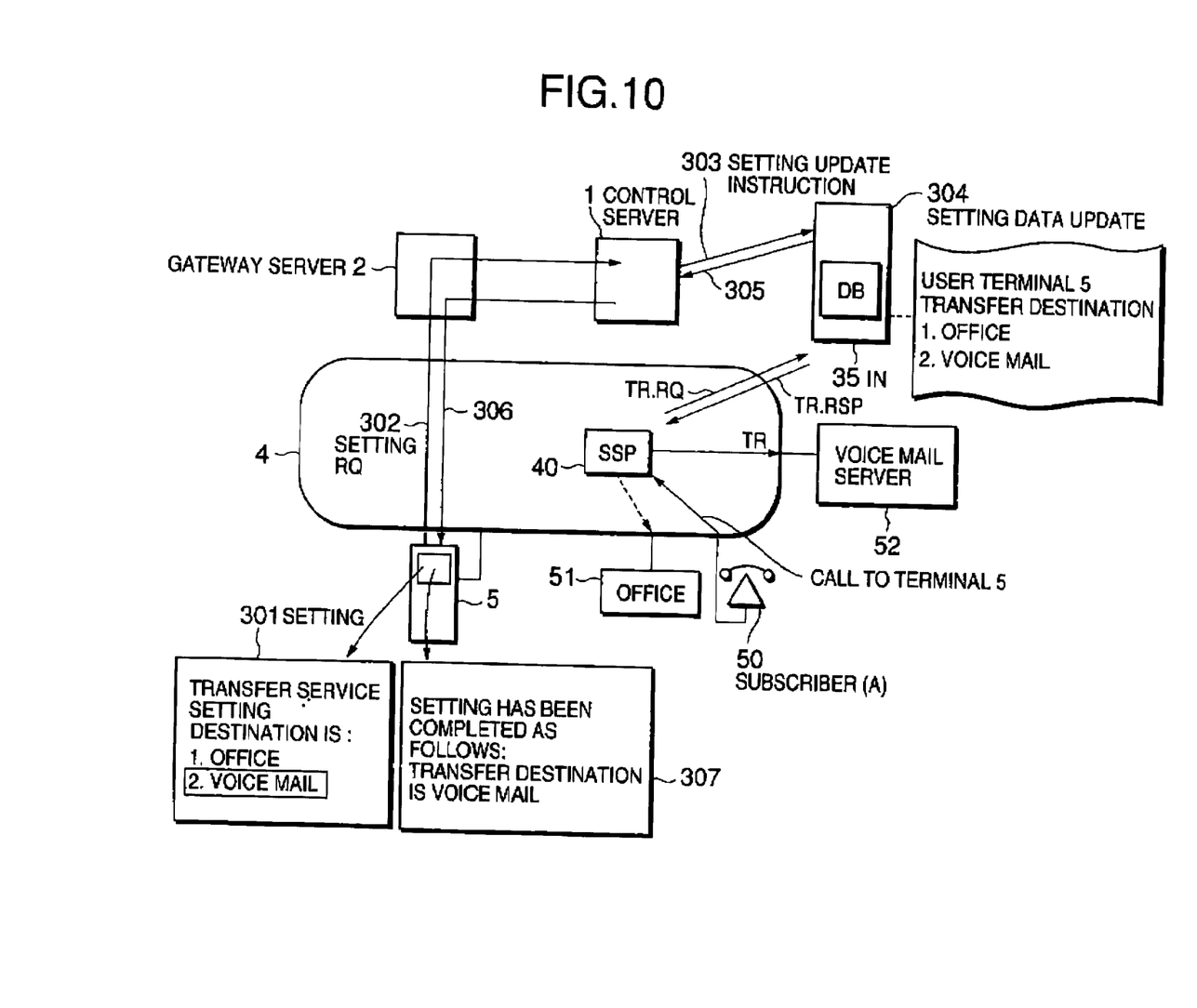
FIG. 10 is a block diagram showing an example of customer control service in the second embodiment of the invention.
Figure 11:
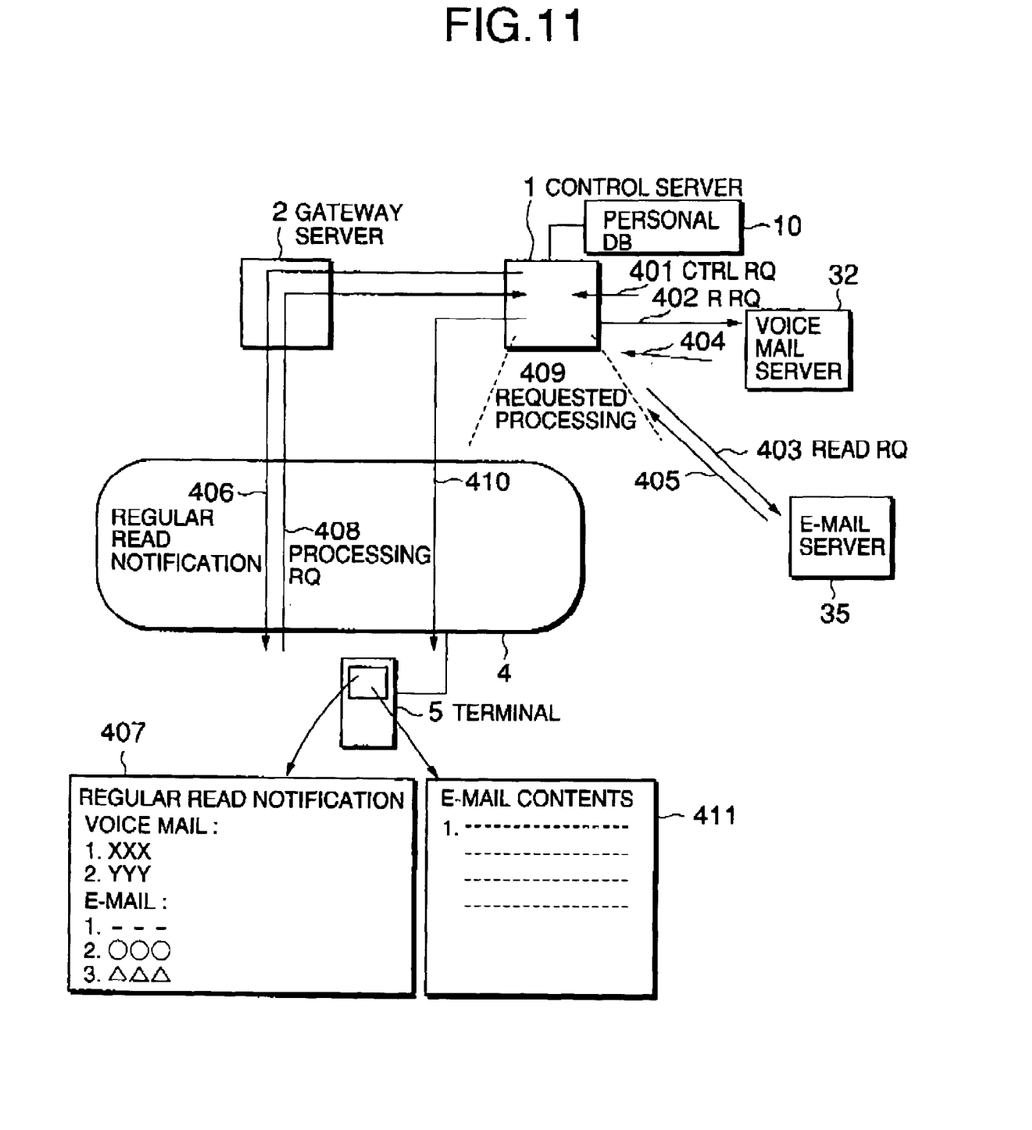
FIG. 11 is a block diagram showing an application of customer control service in the second embodiment of the invention.

FIG. 10 shows a system configuration according to a second embodiment of the present invention for explaining a customer control service, in which blocks and processing steps similar to those previously described with reference to FIG. 4 are denoted by the same reference numerals and the details are omitted.

In FIG. 10, the intelligent network (IN) 35 includes a database. When the service switching point (SSP) 40 detects a call originated by the subscriber 50 and destined to the terminal 5, the SSP 40 detects that the terminal 5 is obtaining the incoming call transfer service and gets access to the IN 35. The IN 35 searches the database for the phone number of the transfer destination and sends it back to the SSP 40. The SSP 40 transfers the incoming call to the terminal 5 to the transfer destination identified by the found phone number.

As described above, the control server 1 controls communications with the value-added services server 3. The gateway server 2 is connected between the control server 1 and each terminal connected to the gateway server 2 through the existing network 4. The gateway server 2 has a content (or protocol) translator for translating an interface protocol to the control server 1 into a predetermined generalized description language operable in each terminal having a browser function.

Therefore, the gateway server 2 provides a unified and user-friendly interface to each terminal. The instruction given to each value-added service node and the result reception from the value-added service node are common to different value-added service nodes, resulting in improved convenience to subscribers.

Since the personal database 10 is available on an individual basis, a combination of the control server 1, the personal database 10 and the value-added service server 3 can provide each user with services meeting the user's demand.

The personal database 10 can also store scenarios for individual users. Therefore, by previously setting a desired scenario, a desired combination of value-added services can be obtained by each user, resulting in improved convenience and improved flexibility in service addition or update.

Further, it is possible to outsource creation of a personal scenario to an outside vendor ensuring a predetermined level of security, resulting in further improved convenience to subscribers.

Further, since a unified interface is provided, even in the case of a new value-added service introduced into the existing network, neither the addition of some provision nor the matching of interface conditions to existing devices related to the new value-added service server is needed all over the existing network. Therefore, the burden on the common carrier becomes lighter.

What is claimed is:

1. A system for providing value-added services to a subscriber through a telecommunication network, comprising:

a value-added service server, comprising a plurality of servers, each of said plural servers providing the subscriber with a different type of value-added service;

a control server connected to the plurality of servers through respective interfaces, for controlling the plurality of servers;

a terminal of the subscriber, which is connected to the telecommunication network and has a browser installed therein, wherein the browser is operable according to a generalized description language;

a gateway server which is connected to the control server and is connected to the terminal through the telecommunication network, wherein the gateway server includes a translator for performing a translation between information according to a protocol used in each of the plural servers and information according to the generalized description language; and a personal database for retrievably storing a plurality of service scenarios defined by individual subscribers, wherein the control server controls the value-added service server and a switching system included in the telecommunication network based on a service scenario retrieved from the personal database according to an instruction issued by the subscriber operating the menu displayed on a display.

2. The system according to claim 1, wherein the gateway server provides a unified interface to the terminal such that the terminal is allowed to gain access to any of the plural servers under a single interface condition.

3. The system according to claim 2, wherein the control server controls the plural servers and a switching system included in the telecommunication network based on a requested service received from the terminal.

4. The system according to claim 3, wherein the control server performs an incoming call transfer control from the terminal to a requested destination by controlling the switching system that received an incoming call to the terminal.

5. The system according to claim 3, wherein the control server instructs an intelligent network to perform an incoming call transfer control from the terminal to a requested destination by controlling the switching system that received an incoming call to the terminal.

6. The system according to claim 2, wherein the control server stores a predetermined service scenario for providing a desired combination of value-added services to the subscriber, wherein the control server controls the value-added service server and a switching system included in the telecommunication network based on the service scenario stored.

7. The system according to claim 1, wherein a new service scenario is stored in the personal database by an authenticated subscriber.

8. The system according to claim 1, wherein each of the service scenarios stored in the personal database is allowed to be updated by a corresponding authenticated subscriber.

9. The system according to claim 1, further comprising:

a scenario server for retrievably storing a plurality of service scenarios created by an authenticated third party, wherein the control server controls the value-added service servers and a switching system included in the telecommunication network based on a service scenario retrieved from the personal database according to an instruction received from a subscriber.

10. The system according to claim 9, wherein each of the service scenarios stored in the scenario server is allowed to be updated by the authenticated third party.

11. The system according to claim 9, further comprising:

a billing database for billing the subscriber by using the service scenario under control of the control server.

12. The system according to claim 1, wherein the telecommunication network includes a mobile network, a fixed telephone network, and Internet.

13. The system according to claim 1, wherein the terminal is a mobile telephone terminal.

14. The system according to claim 13, wherein the generalized description language is one of HTML (hypertext markup language), XML (extensible markup language), and WML (wireless markup language).

15. A system for providing value-added services to a subscriber through a telecommunication network, comprising:

a value-added service server comprising a plurality of servers, each of said plural servers provides the subscriber with a different type of value-added service;

a control server connected to the plurality of servers through respective interfaces, for controlling the plural servers;

a terminal of the subscriber, which is connected to the telecommunication network and has a browser installed therein, wherein the browser is operable on a display according to a generalized description language;

a gateway server which is connected to the control server and is connected to the terminal through the telecommunication network, wherein the gateway server includes a translator for performing a translation between information according to a protocol used in each of the plural servers and information according to the generalized description language; and a personal database for retrievably storing a plurality of service scenarios defined by individual subscribers, wherein the terminal performs an access control to any of the plural servers by operating a menu displayed on the display, and wherein the control server controls the value-added service server and a switching system included in the telecommunication network based on a service scenario retrieved from the personal database according to an instruction issued by the subscriber operating the menu displayed on the display.

16. The system according to claim 15, wherein the gateway server provides a unified interface to the terminal such that the terminal performs the access control under a single interface condition.

17. The system according to claim 13, wherein a new service scenario is stored in the personal database by an authenticated subscriber operating the menu displayed on the display.

18. The system according to claim 13, wherein each of the service scenarios stored in the personal database is updated by a corresponding authenticated subscriber operating the menu displayed on the display.

19. A system for providing value-added services to a subscriber through a telecommunication network, comprising:
- a value-added service server comprising a plurality of servers, each of said plural servers providing the subscriber with a different type of value-added service;
- a control server connected to the plurality of servers through respective interfaces, for controlling the plurality of servers;
- a mobile telephone terminal of the subscriber, which is connected to the telecommunication network and has a browser installed therein, wherein the browser is operable according to a generalized description language selected from one of HTML (hypertext markup language) and XML (extensible markup language);
- a gateway server which is connected to the control server and is connected to the terminal through the telecommunication network, wherein the gateway server includes a translator for performing a translation between information according to a protocol used in each of the plural servers and information according to the generalized description language; and
- a personal database for retrievably storing a plurality of service scenarios defined by individual subscribers, wherein the control server controls the value-added service server and a switching system included in the telecommunication network based on a service scenario retrieved from the personal database according to an instruction issued by the subscriber operating the menu displayed on a display.

* * * * *